Patented Aug. 5, 1947

2,425,283

UNITED STATES PATENT OFFICE 2,425,283

PREPARATION OF ALLYLGLYCINE

Robert S. Long, Somerville, and Corris M. Hofmann, Bound Brook, N. J., assignors to American Cyanamid Company, New York, N. Y., a corporation of Maine No Drawing. Application January 5, 1946, Serial No. 639,407

10 Claims. (Cl. 260—534)

This invention relates to an improved process for preparing allylglycine.

In the past allylglycine, which has the structural formula $CH_2=CH.CH_2.NH.CH_2COOH$, has been prepared by two processes which are primarily of theoretical interest because of their cost. The first process involves the reaction of allylamine with ethyl bromoacetate in ether solution at 0° C., followed by hydrolysis of the resulting ester with a methyl alcoholic barium hydroxide solution. Another proposed method involves the reaction of allylamine with chloroacetamide followed by hydrolysis with aqueous barium hydroxide. The first reaction required the use of an anhydrous medium and both processes necessitated carrying out a separate hydrolysis step. The cost of the reagents and the number of steps involved rendered both processes unsuitable and uneconomical for the production of allylglycine on a commercial scale.

The present invention relates to an improved process of producing allylglycine which operates in a single step with cheap reagents. The reaction is between chloroacetic acid and allylamine, and eliminates any hydrolysis step. However, chloracetic acid cannot be reacted with allylamine under ordinary circumstances to give good yields of allylglycine. Thus, for example, if approximately stoichiometrical proportions are used the yield is very small and side reactions take place, such as the production of allylimino diacetic acid, and the like. Even with a moderate excess of allylamine, for example, 100% excess, yields are uneconomical, amounting to less than 40%. Hydrolysis of the chloracetic acid to hydroxyacetic acid also must be avoided.

According to the present invention chloracetic acid is reacted with a very large excess of allylamine, preferably in aqueous solution. After reaction is complete sufficient aqueous alkali is added to set free all of the allylamine which may be removed by distillation. An aqueous solution of allylglycine remains, from which the allylglycine can be recovered by various methods, for example evaporating off sufficient water and precipitating the hydrochloride. However, it is an important advantage of the present invention that the aqueous solution of allylglycine obtained is sufficiently pure so that it can be used in important chemical reactions without further purification.

The amount of the excess of allylamine should be at least about 700%. Larger excesses may be used with slight increase in yield, but it is unnecessary to go much beyond 700% excess for best economy. Thus, for example, excellent practical results are obtained with about 900% excess. The following table illustrates the effect of various excesses of allylamine.

| Yield of Allylglycine | Excess of Allylamine Used |
|---|---|
| | Per cent |
| 38.3% | 100 |
| 65.2% | 300 |
| 75.0% | 500 |
| 82.5% | 700 |
| 90.2% | 2,900 |

It will be apparent that the gain in yield beyond 700% excess is not great and very soon additional amounts of allylamine offset any small increase in yield.

Good results may be obtained when the excess allylamine is used as a solvent. However, yields are somewhat improved by carrying out the reaction in an aqueous solution. Thus, for example, with a 700% excess of allylglycine 80% yield is obtained in the absence of water, while the addition of water increases the yield up to 85 to 87% at optimum dilution. At 900% excess of allylamine using basic calculations on 0.1 mol of chloracetic acid the yield may be increased from about 83% to slightly over 88% when the amount of water in the reaction is increased from 85 parts to 235 parts. The amount of water to be used in a commercial process depends considerably on the batch size and the equipment available, as the changes in yield are not so marked as to constitute the major consideration. Therefore normally the optimum amount of dilution will be determined by the nature of the equipment available.

It is an advantage of the present invention that the temperature is not critical. In general it is preferable to operate at temperatures not exceeding 20° C. and good results take place down to temperatures as low as 0° C. when operating in aqueous solution. Higher temperatures may be used, but when the temperatures are greatly above 20° C. loss from the hydrolysis of chloracetic acid begins to become serious. It is possible to operate below 0° C. and slightly higher yields may be obtained, but the practical difficulties involved in operating at very low temperatures more than offset any gain in yield.

Allyamine may be recovered in the form of an aqueous solution by the addition of alkali, for example, caustic soda, to the reaction mixture and distillation at atmospheric pressure. Approximately two mols of alkali are needed, one to neutralize the hydrogen chloride formed in the reaction and the second mol to form the sodium salt of allylglycine. The aqueous solution of allylamine may be used in the succeeding preparations, sufficient fresh allylamine being added to raise the total quantity of allylamine present to the desired amount. Since allylamine boils at 53° C. and has an appreciable vapor pressure at room temperature, in order to obtain optimum recovery of allylamine, it is necessary to use an efficient condenser and to cool the receiver. Since the distillate is approximately 60% allylamine by weight, this does not represent the storage of a very large quantity of solution. However, if desired, one may recover anhydrous allylamine with the aid of a fractionating column.

The invention will be illustrated by the following specific examples which are typical. The parts are by weight.

*Example 1*

456 parts of allylamine are mixed with approximately 300 parts of ice and 444 parts of water, the amount of ice being sufficient to give a temperature after mixing of 15° C. or lower. To this mixture is then added in portions with stirring 94.5 parts of chloroacetic acid, the temperature being maintained below 20° C. The reaction mixture is allowed to stand at room temperature until reaction is complete, as determined by analysis of a sample for ionic halogen. To this mixture is then added 82.5 parts of caustic soda. The resulting solution is distilled until the removal of allylamine is complete, the aqueous solution of allylamine which distills over being reserved for use in a subsequent batch. The residual solution, which consists of about 0.85 mole of the sodium salt of allylglycine and one mole of sodium chloride, together with small quantities of by-product, can be used directly for various commercial uses.

The allylglycine may be isolated as the hydrochloride by evaporating to dryness and extracting the residue with ethyl alcohol containing an excess of concentrated hydrochloric acid. The allylglycine hydrochloride is obtained from the alcoholic extract as a crystalline solid by evaporation. The product is sufficiently pure for most uses but may be further purified by solution in alcohol and reprecipitation with an inert solvent such as acetone. The purified hydrochloride melts at 168–170° C.

*Example 2*

To 456 parts of allylamine cooled to below 20° C. is added in portions 94.5 parts of chloroacetic acid, preferably at such a rate that the temperature does not rise above 20° C. After the addition, the reaction mixture is allowed to stand at room temperature until reaction is complete, as determined by analysis of a sample for ionic halogen. There are then added 400 parts of water and 82.5 parts of caustic soda, and the solution is distilled until the removal of excess allylamine is complete. The residual solution consists of about 0.8 mole of the sodium salt of allylglycine and one mole of sodium chloride, together with small quantities of by-products which are not harmful for most commercial purposes. If desired, the allylglycine may be isolated as the hydrochloride as described in Example 1.

We claim:
1. In the preparation of allylglycine, the step which comprises reacting a large excess of free allylamine with chloracetic acid.
2. In the preparation of allylglycine, the step which comprises reacting at least eight mols of allylamine with one mol of chloracetic acid.
3. In the preparation of allylglycine, the step which comprises reacting a large excess of free allylamine with chloracetic acid in a temperature range of approximately 0 to 20° C.
4. In the preparation of allylglycine, the step which comprises reacting at least eight mols of allylamine with one mol of chloracetic acid in a temperature range of approximately 0 to 20° C.
5. A step according to claim 1 in which the reaction mixture is aqueous and an aqueous solution of allylglycine is produced.
6. A step according to claim 2 in which the reaction mixture is aqueous and an aqueous solution of allylglycine is produced.
7. A step according to claim 3 in which the reaction mixture is aqueous and an aqueous solution of allylglycine is produced.
8. A step according to claim 4 in which the reaction mixture is aqueous and an aqueous solution of allylglycine is produced.
9. A process for the preparation of an aqueous solution of allylglycine comprising reacting at least eight mols of allylamine with one mol of chloracetic acid in aqueous solution at temperatures below 20° C., adding approximately two mols of alkali and distilling to remove the unreacted allylamine.
10. A process for the preparation of allylglycine hydrochloride, comprising reacting at least eight mols of allylamine with one mol of chloracetic acid in aqueous solution at temperatures below 20° C., adding approximately two mols of alkali, distilling to remove the unreacted allylamine, evaporating to dryness, extracting the residue with ethyl alcohol containing concentrated hydrochloric acid, and crystallizing out the allylglycine hydrochloride from the alcohol extract.

ROBERT S. LONG.
CORRIS M. HOFMANN.

REFERENCES CITED

The following references are of record in the file of this patent:

UNITED STATES PATENTS

| Number | Name | Date |
|---|---|---|
| 2,097,864 | Platz et al. | Nov. 2, 1937 |
| 2,203,009 | Calcott | June 4, 1940 |

FOREIGN PATENTS

| Number | Country | Date |
|---|---|---|
| 192,026 | Switzerland | Oct. 1, 1937 |

OTHER REFERENCES

James et al., Jour. Chem. Soc. (London), vol. 47, pp. 368–369 (1885).

Alpern et al., Jour. Chem. Soc. (London), vol. 99, p. 86 (1911).

Franklin et al., Jour. Chem. Soc. (London), vol. 101, pp. 1724–1725 (1912).

Moore et al., Jour. Chem. Soc. (London), vol. 101, pp. 2459–2464 (1912).

Glund, Chem. Zent., vol. 85, p. 429 (1914).